No. 697,191. Patented Apr. 8, 1902.
H. K. & H. A. BACON.
COMBINED HAND SEED DRILL AND CULTIVATOR.
(Application filed May 13, 1901.)
(No Model.) 2 Sheets—Sheet 1.
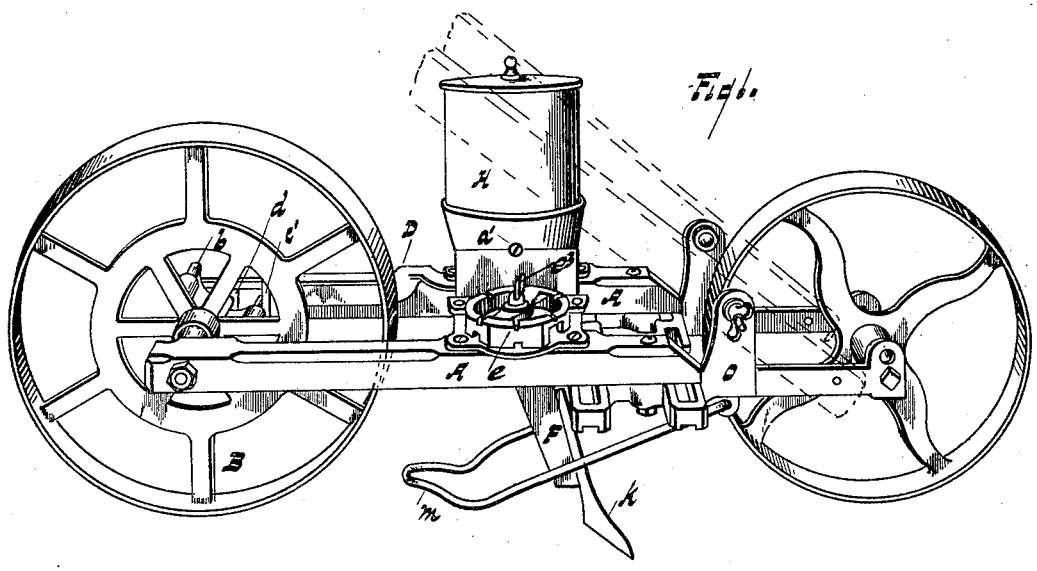
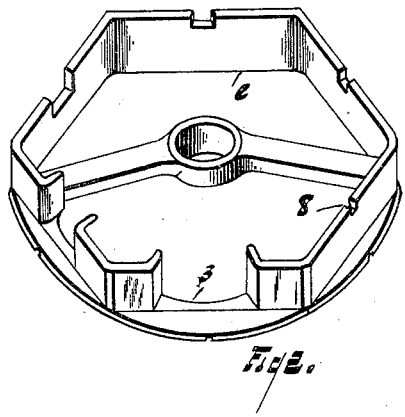
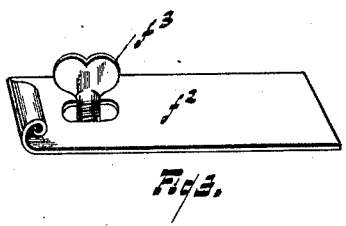
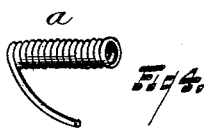
WITNESSES
J. G. Massey
May E. Nott
INVENTORS
Henry K. Bacon
Hiram A. Bacon
By Parker & Burton,
Attorneys.
THE NORRIS PETERS CO., PHOTO-LITHO., WASHINGTON, D. C.

No. 697,191. Patented Apr. 8, 1902.
H. K. & H. A. BACON.
COMBINED HAND SEED DRILL AND CULTIVATOR.
(Application filed May 13, 1901.)
(No Model.) 2 Sheets—Sheet 2.
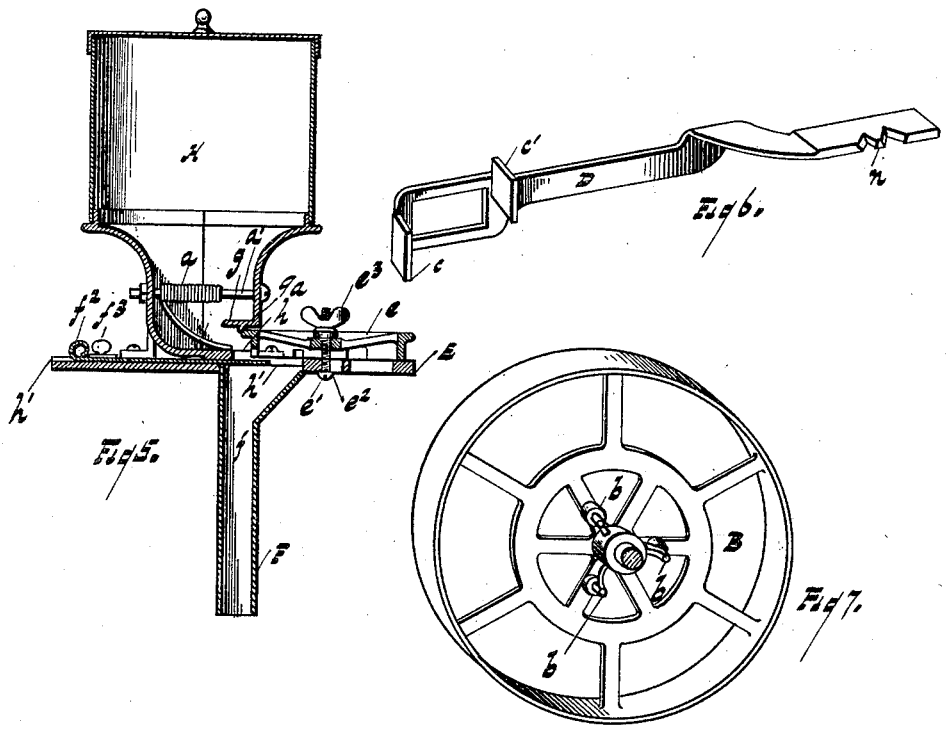
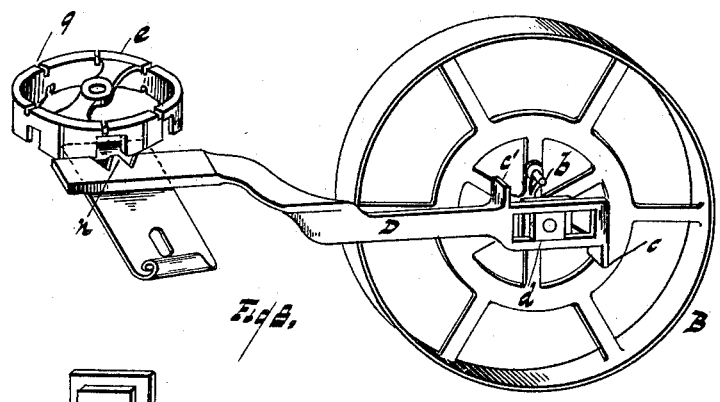
WITNESSES
J. T. Massey
May E. Nott
INVENTORS
Henry K. Bacon
Hiram A. Bacon
By Parker & Burton
Attorneys.

UNITED STATES PATENT OFFICE.

HENRY K. BACON AND HIRAM A. BACON, OF PONTIAC, MICHIGAN.

COMBINED HAND SEED-DRILL AND CULTIVATOR.

SPECIFICATION forming part of Letters Patent No. 697,191, dated April 8, 1902.

Application filed May 13, 1901. Serial No. 59,911. (No model.)

*To all whom it may concern:*

Be it known that we, HENRY K. BACON and HIRAM A. BACON, citizens of the United States, residing at Pontiac, county of Oakland, State of Michigan, have invented a certain new and useful Improvement in a Combined Hand Seed-Drill and Cultivator; and we declare the following to be a full, clear, and exact description of the invention, such as will enable others skilled in the art to which it pertains to make and use the same, reference being had to the accompanying drawings, which form a part of this specification.

This invention relates to a combined hand seed-drill and cultivator and the mechanism for feeding the seed from the hopper to the delivery-chute, and has for its object improvements in that class of agricultural implements intended to be used for drilling or sowing seeds and for cultivating or stirring the ground.

In the drawings, Figure 1 is a side elevation of the implement. Fig. 2 is a perspective of the seed-gage which adapts the drill to various kinds of seeds. Fig. 3 is a perspective of the regulating-slide used with the seed-gage. Its function is to vary the amount of seed sown. Fig. 4 is a perspective of the agitator for working the seed through the hopper-throat to the distributing apparatus. Fig. 5 is a vertical cross-section of the hopper and apparatus for regulating the feed. Fig. 6 is a perspective of the forcing-blade. Fig. 7 is perspective of the drive-wheel. Fig. 8 is a perspective of the drive-wheel, forcing-blade, seed-gage, and regulating-slide in their proper relation to each other. Fig. 9 is the guide-block which carries the end of the forcing-blade and engages it with the driving-wheel.

The implement has a rectangular frame A O, mounted on two wheels B C, which are placed tandem. The rear wheel B is the driving-wheel, and it is provided with a number of pins or lugs $b$, (three are shown in Fig. 7,) which are arranged concentric to the axle and serve to engage against the projections $c$ $c'$ on a reciprocating slide D, Figs. 6 and 8, that engages in the feed apparatus and is employed to work or force the seed regularly through the seed-gage. (See Fig. 8.) The slide may be called a "force-feed" slide, designating it with reference to the purpose for which it is employed. It is reciprocated by the rotation of the pins $b$, which successively wipe against the faces $c$ and $c'$ and give to the slide a reciprocating motion that is more rapid than would be the reciprocating motion produced by a crank engagement. The end of the slide is carried on a guide-block $d$, secured to the frame A.

The hopper H is mounted on the frame A and contracts downward to a side opening $h$, in which is inserted the edge of a seed-gage $e$, as shown in the drawings. The gage is rotary and is journaled on a vertical axis $e'$. The feed-gage may be polygonal or of any other convenient form and is provided with passages adapted to various seeds. Its vertical walls are straight and of any suitable number, and through each vertical wall is an opening, which, as seen in Fig. 2, has the shape of a notch. The notch or opening on each side is of a size proper for some one of the different sizes of seeds to be sown. For example, the notch 3 is of a size suitable for the largest size of seed sown, and the notch 8 is of a size suitable for the smallest seeds and other notches for seeds intermediate. Opposite each seed notch or passage and on that side of the gage which comes uppermost in the assembled implement are other notches, one of which is seen at 9 of Fig. 8, and these are arranged to engage a lug $9^a$ (seen in Fig. 5) and prevent the gage from rotation after it has been once brought to its working position.

In order that the position of the gage may be changed, the vertical journal on which the gage is pivoted engages through a slot $e^2$ in the base-plate E and is held by a thumb-nut $e^3$. The nut may be loosened, the gage withdrawn from its position adjacent to the opening $h$. The gage may then be turned on its axis and moved back again to its former position, another notch engaging on the lug $9^a$. (See Fig. 5.)

Under the hopper and extending under the opening $h$ in the base-plate E is a depression $h'$, in which is placed a slide $f^2$, Fig. 3. This slide projects under the edge of the polygonal seed-gage and forms a regulator to the seed notch or passage. By moving this slide in or out the passage is lengthened or shortened, thereby varying the amount of seed sown without changing the other dimensions of the notch or passage, Figs. 5 and 8. The slide $f^2$ is held in position by a thumb-screw $f^3$. This property of varying the amount of seed sown by lengthening or shortening the passage without changing its other dimensions admits of the usage of a relatively larger passageway and materially facilitates the sowing, especially of the more difficult and irregular varieties of seeds.

The feed-slide D has one end flattened and arranged to be disposed horizontally with respect to the hopper, and it has upon the edge lying next the seed-gage one or more notches, preferably two. They are V-shaped and beveled upon the upper edges, so that the notches are wider upon the upper side of the bar than on the lower side of the bar.

The reciprocating slide D, with its V-shaped notches, works the seed toward and through the passage and being beveled at the notches does not crush or grind the seed against the side walls of the passage. Another feature of this form of forcer is that as the finger $n$, Fig. 8, formed between two notches, passes in front of the seed-passage and urges the seed through the following notch allows another bunch of seed to drop to place in the opening of the passage, ready to be acted upon by the return movement of the finger. This materially facilitates the sowing of light and irregular seeds that do not unaided move readily to an opening. The slide reciprocates with the notches directly in front of the seed-passage, and the seeds, acted on by gravity, the pressure of seeds behind, and the reciprocation of the slide, are regularly fed through the seed-passage in the seed-gage into the spout F.

In the mouth of the hopper over the outlet-opening $h$ is a guard $g$, that has somewhat the shape of a shelf projecting inward over the opening $h$. This serves to keep the weight of the seeds off from that part of the seed which is passing directly through the seed-gage and prevents clogging at this point and facilitates the even distribution of the seed and more especially those of irregular size and shape.

An agitator $a$ is hung on a pin $a'$, the end of which projects into the space under the guard $g$ and is bent downward at its lower end so that it projects into and engages in one of the notches of the slide D. The swinging motion produced by the reciprocation of the slide D prevents the seed clogging in the throat leading under the guard $g$.

The seeds drop from the seed-passage in the seed-gage into the chute $f$ and are deposited behind the point or furrow-opener $k$ and covered by the drag $m$, the drive-wheel following and pressing the earth over the seeds.

In the combination of drill and cultivator (see Fig. 1) the front wheel C with the casting $o$, to which it is journaled, form a simple single-wheel cultivator and the front support of the combination. The hind wheel B is the rear support of the combination and also acts as seed-roller and drive-wheel of the drill part of the combination. In the combination the free ends of the bed-pieces A rest upon or are carried under the casting O and are secured in position by bolts passing through the bed-pieces and casting. The points gained by this combination are simplicity and ease, by which the parts are combined or detached, and no special or objectionable modification is required in either the drill or cultivator.

What we claim is—

1. In a seed-drill, the combination of a hopper, a passage leading from said hopper, and a slide adapted to reciprocate in said hopper at one side of the opening to said passage said slide being provided with a notch adjacent to said opening.

2. In a seed-drill, the combination of a hopper, a seed-passage leading from said hopper, a slide adapted to reciprocate in said hopper at one side of the opening to said passage, said slide being provided adjacent to said opening with a notch having outwardly-diverging walls.

3. In a seed-drill, the combination of a hopper, a seed-passage leading from said hopper, a slide adapted to reciprocate in said hopper at one side of the opening to said passage, said slide being provided with a notch adjacent to said opening, and a seed-agitator engaging with said slide and adapted to be actuated by the movement thereof.

4. In a seed-drill, the combination of a hopper, a seed-passage leading from said hopper, a slide adapted to reciprocate in said hopper at one side of the opening to said passage, said slide being provided with a notch adjacent to said opening, and a seed-agitator engaging in said notch.

5. In a seed-drill, the combination of a hopper, a horizontal seed-passage leading from said hopper, a slide adapted to reciprocate in said hopper at one side of the opening to said passage, said slide being provided with a notch adjacent to said opening, and a longitudinally-adjustable bottom to said passage.

In testimony whereof we sign this specification in the presence of two witnesses.

HENRY K. BACON.
HIRAM A. BACON.

Witnesses:
J. L. HITCHCOCK,
LEONORA A. JONES.